(12) United States Patent
Legde

(10) Patent No.: US 12,330,583 B2
(45) Date of Patent: Jun. 17, 2025

(54) TENSIONING DEVICE FOR A SEAT BELT COMPONENT

(71) Applicant: Autoliv Development AB, Vargarda (SE)

(72) Inventor: Dietmar Legde, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 325 days.

(21) Appl. No.: 17/759,976

(22) PCT Filed: Jan. 11, 2021

(86) PCT No.: PCT/EP2021/050359
§ 371 (c)(1),
(2) Date: Aug. 2, 2022

(87) PCT Pub. No.: WO2021/156015
PCT Pub. Date: Aug. 12, 2021

(65) Prior Publication Data
US 2023/0064059 A1 Mar. 2, 2023

(30) Foreign Application Priority Data

Feb. 7, 2020 (DE) ..................... 10 2020 103 157.2

(51) Int. Cl.
*B60R 22/195* (2006.01)
*B60R 22/46* (2006.01)

(52) U.S. Cl.
CPC ........ *B60R 22/195* (2013.01); *B60R 22/4628* (2013.01); *B60R 22/1952* (2013.01); *B60R 22/1954* (2013.01); *B60R 22/1955* (2013.01)

(58) Field of Classification Search
CPC .............. B60R 22/195; B60R 22/1952; B60R 22/1954; B60R 22/1955; B60R 22/46;
(Continued)

(56) References Cited

U.S. PATENT DOCUMENTS 3,871,470 A * 3/1975 Schwanz ................. B60R 22/28
180/268
3,999,780 A * 12/1976 Matsuoka ........... B60R 22/1955
297/480

(Continued)

FOREIGN PATENT DOCUMENTS

DE        29708880 U1    9/1997
DE        10250499 A1    5/2004
(Continued)

*Primary Examiner* — Laura Freedman
(74) *Attorney, Agent, or Firm* — DICKINSON WRIGHT PLLC

(57) ABSTRACT

A seat belt tensioning device with a gas generator for generating a compressed gas, a piston driven by the compressed gas, a tension cable which is connected to the piston and is connectable to a seat belt component to be set into a tensioning movement, a tensioner tube for receiving and guiding the piston, and a guide block that forms a cable guide and in which a receptacle receiving the gas generator and a pressure chamber connected in terms of flow to the receptacle are formed, wherein the guide block is connected to the tensioner tube, and the tension cable runs rectilinearly in a piston movement direction from the tensioner tube through the pressure chamber, wherein the guide block forms a linear guide adjoining the pressure chamber such that the tension cable can be led out of the guide block on the side opposite the tensioner tube.

4 Claims, 2 Drawing Sheets

(58) Field of Classification Search
CPC ............ B60R 22/4619; B60R 22/4628; B60R 22/4633
See application file for complete search history.

(56) References Cited

U.S. PATENT DOCUMENTS

| | | | | |
|---|---|---|---|---|
| 4,258,934 A * | 3/1981 | Tsuge | ................. | B60R 22/1955 297/480 |
| 4,441,738 A * | 4/1984 | Tsuge | ................. | B60R 22/1955 60/632 |
| 4,458,921 A * | 7/1984 | Chiba | ................. | B60R 22/1952 280/806 |
| 4,508,287 A * | 4/1985 | Nilsson | ............... | B60R 22/4619 280/806 |
| 4,927,175 A * | 5/1990 | Fohl | ................... | B60R 22/4619 297/480 |
| 5,310,219 A * | 5/1994 | Fohl | ................... | B60R 22/4619 297/480 |
| 5,568,940 A * | 10/1996 | Lane, Jr. | ............. | B60R 22/1952 297/480 |
| 5,671,949 A * | 9/1997 | Bauer | ................. | B60R 22/1952 297/480 |
| 5,863,009 A * | 1/1999 | Bauer | ................. | B60R 22/1952 242/374 |
| 5,871,236 A * | 2/1999 | Bauer | ................. | B60R 22/1952 297/480 |
| 5,897,140 A * | 4/1999 | Wier | ....................... | F15B 15/19 280/806 |
| 5,911,433 A * | 6/1999 | Swann | ................ | B60R 22/4604 280/730.2 |
| 6,039,353 A * | 3/2000 | Bauer | ................. | B60R 22/1952 297/480 |
| 6,068,664 A | 5/2000 | Meyer et al. | | |
| 6,250,682 B1 | 6/2001 | Betz et al. | | |
| 7,878,548 B2 * | 2/2011 | Kohama | ............. | B60R 22/1952 297/480 |
| 8,132,829 B2 * | 3/2012 | Sugiyama | ............ | B60R 22/1952 297/480 |
| 8,196,962 B2 * | 6/2012 | Sugiyama | ........... | B60R 22/1952 297/480 |
| 9,834,174 B2 | 12/2017 | Kacprzak | | |
| 10,953,846 B2 * | 3/2021 | Zorgel | ................ | B60R 22/1955 |
| 2024/0300440 A1 * | 9/2024 | Vollmer | ................ | B60R 22/1955 |

FOREIGN PATENT DOCUMENTS

| | | |
|---|---|---|
| DE | 10356878 A1 | 5/2004 |
| DE | 102015111083 B4 | 7/2018 |
| EP | 0186880 A2 | 7/1986 |
| EP | 1737711 A1 | 1/2007 |
| WO | 2004/039642 A1 | 5/2004 |

* cited by examiner

TENSIONING DEVICE FOR A SEAT BELT COMPONENT

CROSS-REFERENCE TO RELATED APPLICATIONS

This application is a 35 U.S.C. § 371 national phase of PCT International Application No. PCT/EP2021/050359, filed Jan. 11, 2021, which claims the benefit of priority under 35 U.S.C. § 119 to German Patent Application No. 10 2020 103 157.2, filed Feb. 7, 2020, the contents of which are incorporated herein by reference in its entirety.

FIELD OF THE INVENTION

The present invention relates to a tensioning device for a seat belt component, with a gas generator for generating a compressed gas, a piston that can be driven by the compressed gas, a tension cable that is connected to the piston and is connectable to a seat belt component to be set into a tensioning movement, a tensioner tube for receiving and guiding the piston, and a guide block that forms a cable guide and in which a receptacle receiving the gas generator and a pressure chamber connected in terms of flow to the receptacle are formed, wherein the guide block is connected to the tensioner tube, and the tension cable runs rectilinearly in a piston movement direction from the tensioner tube through the pressure chamber.

BACKGROUND

Such a tensioning device is known, for example, from DE 10 2015 111 083 B4, with which the guide block forms a cable deflection, so that the seat belt component is deflected in the direction of the seat belt component to be tensioned from the pressure chamber by a deflection guide in the guide block transversely to the piston movement direction. Such a deflection of the tension cable by the guide block has previously been necessary, since the tensioning device is mounted laterally next to a vehicle seat, and the piston movement direction is oriented to be parallel to the longitudinal axis of the vehicle, wherein a belt buckle or an end fitting of a seat belt is generally tensioned via the tension cable. The need has now developed for the tensioning device to be mounted also in a different orientation in the motor vehicle.

It is therefore an aim of the present invention to provide a tensioning device that can be mounted with a different orientation in the motor vehicle and/or that enables greater flexibility in the configuration of the tensioning device.

The aim is achieved by a tensioning device having the features of the independent claim. Advantageous developments of the tensioning device are specified in the dependent claims and in the description, wherein individual features of the advantageous developments can be combined with one another in a technically sensible manner.

The aim is achieved, in particular, by a tensioning device having the features mentioned at the outset, with which the guide block forms a linear guide that adjoins the pressure chamber and is configured in such a way that the tension cable can be led out of the guide block in parallel to the piston movement direction on the side opposite the tensioner tube.

SUMMARY

Thus, in its basic idea, the invention provides that the one-piece guide block be formed in such a way that the tension cable emerges from the guide block in parallel alignment with or offset parallel to the piston movement direction, so that the tensioner tube providing the piston movement direction can be aligned parallel to or offset parallel to the tensioning movement of the seat belt component. Alternatively, it is possible for the tension cable to be deflected outside the guide block with additional means. Thus, the tensioning device can therefore be placed in other locations than previously usual in the motor vehicle.

In order to prevent the tension cable from being moved unintentionally after the tensioning device has been assembled and prior to or even after the tensioning device has been installed in the motor vehicle, and thus also to prevent the piston in the tensioning tube from assuming an undesired position, it can be provided that linear guide have at least one resistance element that is arranged in particular in the linear guide, wherein the resistance element counteracts an unintentional movement of the tension cable. It can therefore be provided, for example, that projecting projections or constrictions be formed in the guide block outside the pressure chamber in the linear guide, which prevent a relative movement of the tension cable and thus of the piston relative to the tensioner tube prior to installation or even after installation in the motor vehicle.

In principle, it is possible for the resistance element to be formed in one piece on the guide block. However, it is preferred that the resistance element be formed as an independent component and be inserted into the linear guide formed by the guide block. The independent component is made of a different material than the guide block.

The component used is preferably made of a plastic, wherein the at least one resistance element formed by the component is reduced at the beginning of a tensioning process due to the friction between the tension cable and the at least one resistance element. For example, projections initially in contact with the tension cable can be formed on the component formed from plastic, which projections prevent the unintentional movement of the tension cable, but are reduced in height at the beginning of the tensioning process due to friction with the tension cable, so that their resistance is reduced. Such an independent component is useful in particular if the tension cable is guided out of the guide block aligned in parallel with the piston movement direction.

However, a resistance element can also be formed by generating a chicane for the tension cable by the guide block itself or by a component inserted into the guide block. In particular, the resistance element can form an S-shaped guide for the tension cable by the guide block or its linear guide, so that the tension cable exits the guide block with a parallel offset to the piston movement direction.

So that the guide block can be used not only for a novel arrangement of the tensioning device, but can also be used as a guide block in tensioning devices already known, it can be provided that, in addition to the linear guide, a deflection guide be formed in the guide block, which deflection guide is configured such that the tension cable can be led out of the guide block obliquely to the piston movement direction. Thus, both a linear guide and a deflection guide are formed in the guide block, so that the guide block can be used flexibly. In particular, the guide block can be formed such that the deflection guide branches off from the linear guide and in particular enables a cable deflection of more than 20°, preferably more than 45°, and particularly preferably of more than 90°.

If the resistance element is formed on an independent component, it can be provided that the independent component be shaped such that it is arranged both in the linear guide and in the deflection guide. In this way, a position of the component in the guide block is also reliably predetermined, and the movement of the independent component is prevented. In particular, the independent component is formed such that it extends, with the section forming the resistance elements, along the linear guide, while a holding section engages in the deflection guide.

BRIEF DESCRIPTION OF THE DRAWINGS

The invention and the technical environment are explained below by way of example with reference to the figures. The following are shown schematically.

DETAILED DESCRIPTION

Figure 1:
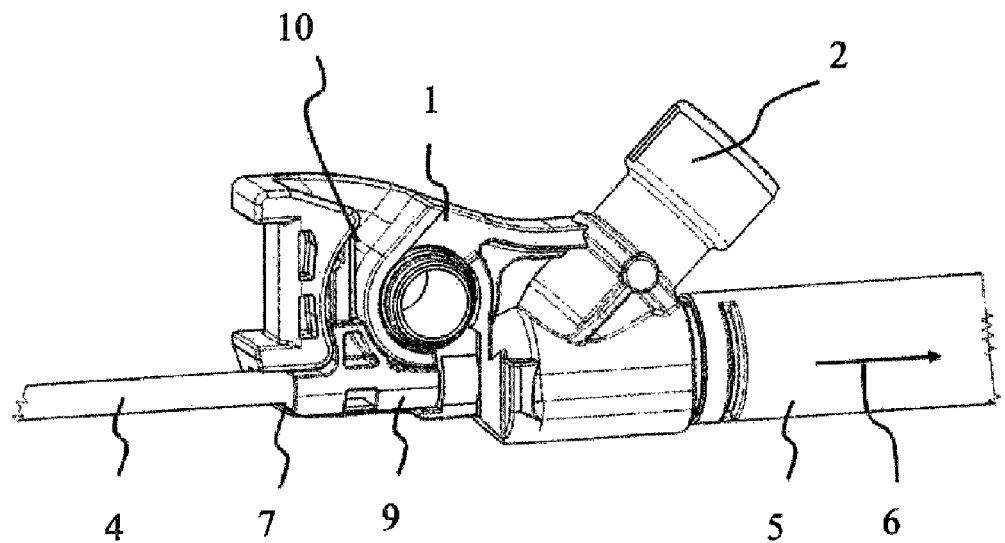
FIG. 1 shows a tensioning device.
Figure 3:
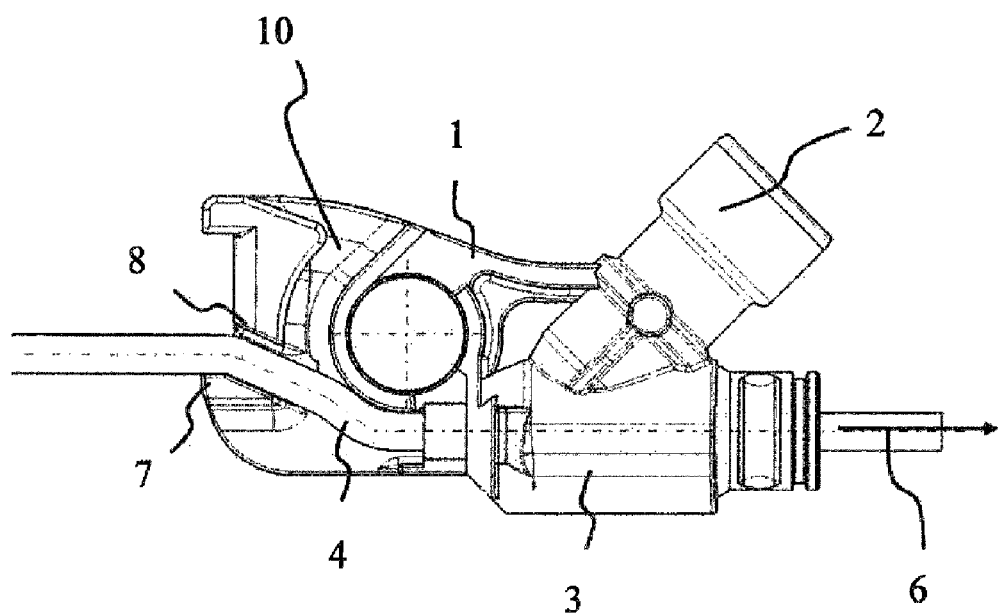
FIG. 3 shows a detailed illustration of an additional embodiment of a tensioning device.

The tensioning devices shown in FIGS. 1 and 3 in each case comprise a guide block 1 in which a receptacle 2 for a gas generator (not shown) is formed. The receptacle 2 is connected in terms of flow to a pressure chamber 3 formed in the guide block 1.

A tension cable 4 is guided rectilinearly through the pressure chamber 3 and into a tensioner tube 5. Within the tensioner tube 5, the tension cable 4 is connected to a piston (not shown). The arrangement of the piston on the tension cable and in the tensioner tube is already mentioned in DE 10 2015 111 083 B4 mentioned in the introduction, to which reference is made in this regard. However, the arrangement of the piston is also not important for the present invention.

When triggered, the gas generator generates a compressed gas that is guided through the pressure chamber 3 into the tensioner tube 5 and there drives the piston, and thus also the tension cable 4, in a piston movement direction 6.

On the side facing away from the tensioner tube 5, the guide block 1 is formed such that the tension cable 4 is guided in parallel alignment with (FIG. 1) or with a parallel offset (FIG. 3) out of the guide block 1. Thus, the guide block 1 has a linear guide 7. In addition, the guide block 1 also has a deflection guide 10, so that the tension cable 4 could also be guided out of the guide block 1 transversely to the piston movement direction 6 (not shown in the figures).

In order to prevent the tension cable 4 and thus the piston from being unintentionally moved prior to a tensioning process, a resistance element 8 is provided.

Figure 2:
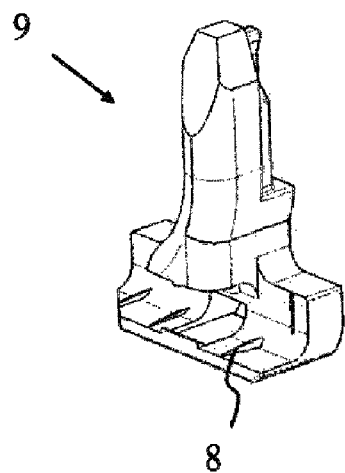
FIG. 2 shows an independent component for forming a resistance element of the tensioning device according to FIG. 1.

According to the embodiment of FIGS. 1 and 2, the resistance element 8 is formed by projections on an independent component 9. The independent component 9 is shaped such that it is arranged with a holding section in the deflection guide 10, and with the section having the resistance element 8 in the linear guide 7. At the beginning of a tensioning process triggered by the gas generator, the projections on the individual component 9 are reduced in height due to the friction with the tension cable 4, so that the friction or the resistance also decreases.

According to the embodiment of FIG. 3, the resistance element 8 is formed by a type of chicane, so that the tension cable 4 is deflected in an S-shaped manner, thereby providing resistance While the above description constitutes the preferred embodiment of the present invention, it will be appreciated that the invention is susceptible to modification, variation and change without departing from the proper scope and fair meaning of the accompanying claims.

The invention claimed is:

1. A tensioning device for a seat belt component, comprising;
    a gas generator for generating a compressed gas,
    a piston that can be driven by the compressed gas,
    a tension cable that is connected to the piston and is connectable to the seat belt component to be set into a tensioning movement,
    a tensioner tube for receiving and guiding the piston, and
    a guide block that forms a cable guide, and forms a receptacle receiving the gas generator, and further forms a pressure chamber connected in terms of flow of the compressed gas to the receptacle, wherein
    the guide block is connected to the tensioner tube, and the tension cable runs rectilinearly in a piston movement direction from the tensioner tube through the pressure chamber, wherein
    the guide block forms a linear guide that adjoins the pressure chamber and is configured in such a manner that the tension cable is led out of the guide block parallel to the piston movement direction on a side opposite the tensioner tube wherein, in the linear guide, at least one resistance element is arranged, which counteracts an unintentional movement of the tension cable, wherein the at least one resistance element is formed by a component inserted into the linear guide, the component is made of plastic, and the at least one resistance element formed by the component has projections which are reduced in height at the beginning of a tensioning process due to friction.

2. A tensioning device for a seat belt component, comprising;
    a gas generator for generating a compressed gas,
    a piston that can be driven by the compressed gas,
    a tension cable that is connected to the piston and is connectable to the seat belt component to be set into a tensioning movement,
    a tensioner tube for receiving and guiding the piston, and
    a guide block that forms a cable guide, and forms a receptacle receiving the gas generator, and further forms a pressure chamber connected in terms of flow of the compressed gas to the receptacle, wherein
    the guide block is connected to the tensioner tube, and the tension cable runs rectilinearly in a piston movement direction from the tensioner tube through the pressure chamber, wherein
    the guide block forms a guide that adjoins the pressure chamber and is configured in such a manner that the tension cable is led out of the guide block parallel to the piston movement direction on a side opposite the tensioner tube wherein, in the guide, at least one resistance element is arranged, which counteracts an unintentional movement of the tension cable, wherein the at least one resistance element is in the form of an S-shaped guide of the tension cable and provides a parallel offset of the tension cable.

3. A tensioning device for a seat belt component, comprising;
    a gas generator for generating a compressed gas,
    a piston that can be driven by the compressed gas,
    a tension cable that is connected to the piston and is connectable to the seat belt component to be set into a tensioning movement,
    a tensioner tube for receiving and guiding the piston, and a guide block that forms a cable guide, and forms a receptacle receiving the gas generator and, further forms a pressure chamber connected in terms of flow of the compressed gas to the receptacle, wherein the guide block is connected to the tensioner tube, and the tension cable runs rectilinearly in a piston movement direction from the tensioner tube through the pressure chamber, wherein a deflection guide is formed in the guide block, which is configured such that the tension cable can be led out of the guide block obliquely to the piston movement direction, the deflection guide adjoins the pressure chamber and is configured in such a manner that the tension cable is led out of the guide block on a side opposite the tensioner tube wherein, in the deflection guide, at least one resistance element is arranged, which counteracts an unintentional movement of the tension cable, wherein the at least one resistance element is formed by a component inserted into the deflection guide, the inserted component is made of plastic, and the at least one resistance element is formed by the component has projections which are reduced in height at the beginning of a tensioning process due to friction.

4. The tensioning device according to claim 3, wherein the component forming the at least one resistance element is arranged both in the guide block and in the deflection guide.

* * * * *